June 20, 1939.  E. MOREHOUSE  2,162,820
FINDING FOR A PIN STEM JOINT OR CATCH AND METHOD OF MAKING THE SAME
Filed Nov. 27, 1935
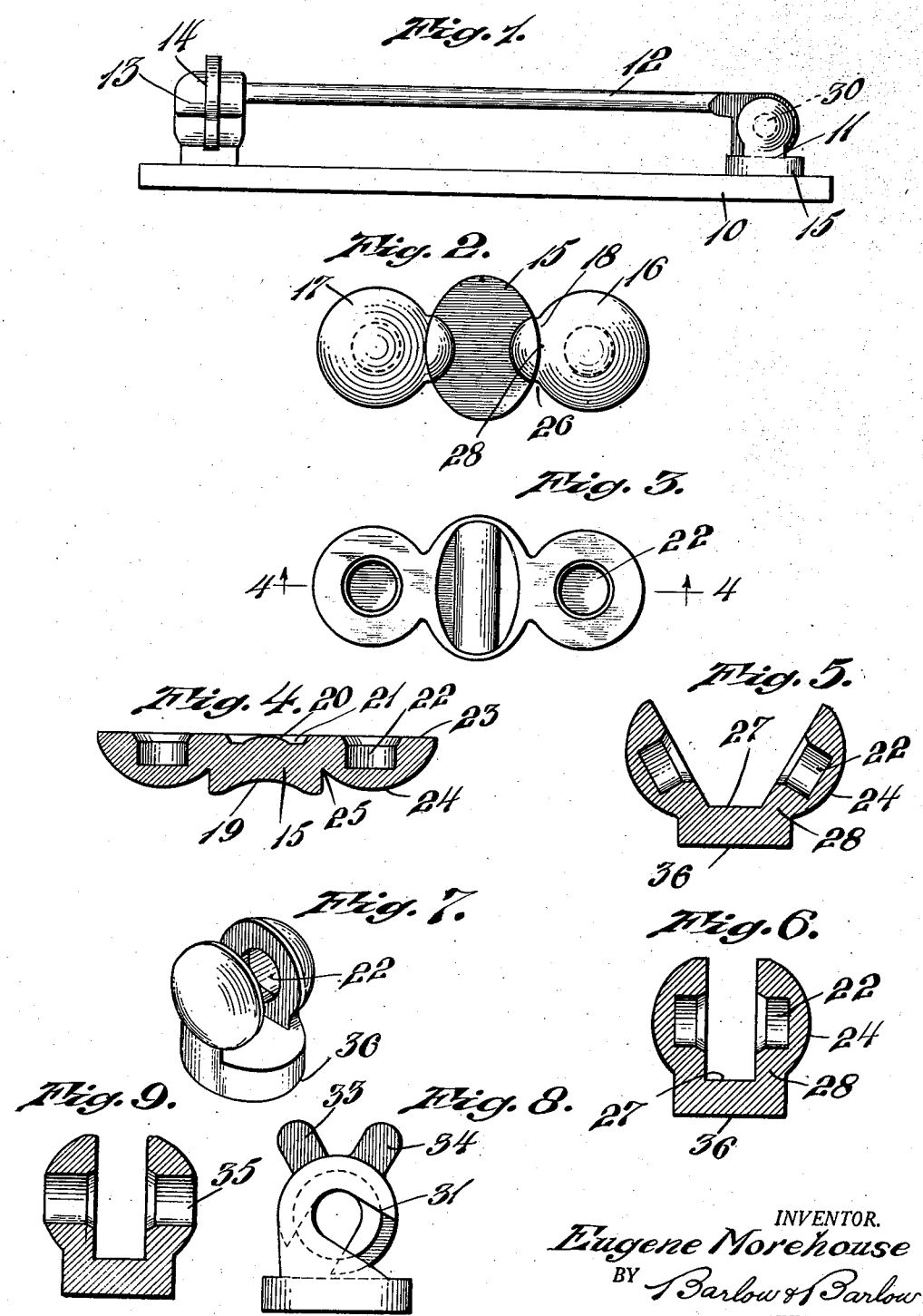
INVENTOR.
Eugene Morehouse
BY Barlow & Barlow
ATTORNEYS.

Patented June 20, 1939

2,162,820

UNITED STATES PATENT OFFICE 2,162,820

FINDING FOR A PIN STEM JOINT OR CATCH AND METHOD OF MAKING THE SAME

Eugene Morehouse, Providence, R. I., assignor to B. A. Ballou & Co., Inc., a corporation of Rhode Island Application November 27, 1935, Serial No. 51,773

6 Claims. (Cl. 29—160.6)

This invention relates to a finding for a pin stem joint or catch, and has for one of its objects to provide a base for the finding which may be made of any thickness and which is not weakened by reason of a bending of the base through an angular degree of any substantial extent.

Another object of the invention is to provide a base which is sufficiently rigid so that any tendency toward flexing will be sufficiently resisted to prevent a fracture of the solder which secures the base to its support.

Another object of the invention is to provide a base which may be held to its support with an adhesion or strength greater than the strength of the lugs or ears which project therefrom so that strains on the lug will not be transmitted to the base with sufficient force to rupture or detach the base from its holding to its support.

Another object of the invention is the provision of ears which may be drawn up spaced apart just sufficiently to receive the pivotal mounting of the part which is to be supported thereby without the danger of bending the base and rupturing its solder connection in completing the bending of the ears to their final parallel position.

With these and other objects in view, the invention consists of certain novel features of construction, as will be more fully described, and particularly pointed out in the appended claims.

In the accompanying drawing:

Fig. 1 is an elevation of a bar pin showing my improved device in use in both a pin stem joint and in a safety catch;

Fig. 2 is a bottom plan view of the shaped blank before bending;

Fig. 3 is a plan view of the opposite side of the device from that shown in Fig. 2;

Fig. 4 is a section on line 4—4 of Fig. 3;

Fig. 5 is a central sectional view similar to Fig. 4 with the ears partially bent to finished position;

Fig. 6 is a sectional view similar to Fig. 5 showing the ears bent to finished position;

Fig. 7 is a perspective view of the finding bent to finished position;

Fig. 8 is an end view of a modified form showing the construction used in a safety catch instead of a pin stem joint;

Fig. 9 is a sectional view of either the structure shown in Fig. 8 or the modification as shown in Fig. 7 with the pierced bearings extending completely through the ears.

In the use of pin stem joints or safety catches there is a growing demand for a finding of a character which may be soft soldered onto an ornament or other support, the soft solder being weaker in its attachment than hard solder requires that there be a greater surface available for attachment and I have adopted various means for enlarging the base of the catches or pin stem joints which form the subject of other inventions in patent applications which I have pending. I find, however, that it is desirable that the base be rigid so that there will be no rupture of the attaching solder when the base is secured to its desired support; and accordingly, I have provided a base which is sufficiently rigid so that any strains brought to bear on the ears will cause the twisting of the ears on the base before the solder attaching the base to the ornament is ruptured. I also provide the ears of such structure that a more or less ball surface is presented and one in which in certain forms the rotor member or its mounting means need not extend through the outer surface of the ears; and the following is a more detailed description of the present embodiment of this invention, illustrating the preferred means by which these advantageous results may be accomplished:

With reference to the drawing, 10 designates the ornamental bar of a breast pin with which my invention is associated, 11 designates the pin stem joint in which a pin stem 12 is pivotally mounted, while 13 designates a safety catch with its rotor member 14 for locking the pin stem in desired position. The pin stem joint 11 and safety catch 13 are similarly formed and the description following is applicable to both of them.

There is first struck up between matched dies a structure of different thicknesses such as illustrated in Figures 2, 3 and 4 consisting of a central base portion 15 with side ears 16 and 17 extending therefrom and joined thereto by a narrow neck portion 18. This base portion 15 is concave as at 19 on its lower surface and convex as at 20 with recesses 21 on its opposite upper surface, while the ears 16 and 17 are recessed as at 22 to provide bearings on their inner flat surface 23, and the surface which is to become the outer portion of the ears after they are folded is convex as at 24 to follow generally a portion of the surface of a sphere. The formation of this portion of a sphere reduces the stock as at 25 which together with the inward curvature as at 26 provides a rather narrow neck portion and reduces the stock to such an extent that the ear when folded up will definitely bend at this more weakened point of the structure and as bending occurs there is a slight stretching of the base by the forming tools so that the concavity 19 disappears into the smooth flat surface 36 and the convexity 20 disappears into the smooth flat surface 27, and the supporting neck portion 28 between the ear and its base is of such strength that it will bend before any strain placed on the ear tending to twist the device off of its ornamental support 10 will rupture the solder which secures the surface 36 to the ornamental support 10 such as shown in Figure 1.

The ears are bent to substantially the position shown in Figure 5 when the base 15 is soldered to the support 10. The pin stem 12 with trunnions 30 is then positioned so that upon further bending the bearings 22 will receive the trunnions 30. This bending is completed by the entire bending coming at the neck 28 without bending or in any way distorting the base which is of advantage in this finding. Further, by reason of the ball-shaped or partially spherical outer surface 24 this trunnion does not extend through the ear to the outer surface so as to be visible in viewing the catch.

When used as a safety catch the ears may be slotted as at 31 and a rotor member 32 may be positioned with finger pieces 33, 34 extending from between the ears for manipulation of the same.

Should a pivot pin instead of trunnions on the pin stem such as 12 be desired the bearing 35 as shown in Figure 9 may extend through the ears permitting the pivot pin to be positioned after the pin stem is in place between the ears in which case the ears will be bent into finished position as shown in Figure 6 in one step instead of in two steps as above explained.

The foregoing description is directed towards the method and construction illustrated, but I desire it to be understood that I reserve the privilege of resorting to all the equivalent changes to which the construction and method are susceptible, the invention being defined and limited only by the terms of the appended claims.

I claim:

1. A blank for a pin stem joint or catch comprising a base portion of convex upper surface and concave lower surface, ears on either side of the base and in the plane thereof, and neck portions thinner than said ears or base connecting the base and ears.

2. A blank for a pin stem joint or catch comprising a base portion of convex upper surface and concave lower surface, ears on either side of the base having a convex surface conforming to the surface of a sphere on one side and a plane surface on the other, and neck portions thinner than said ears or base connecting the base and ears.

3. A blank for a pin stem joint or catch comprising a base portion of convex upper surface and concave lower surface, ears on either side of the base having a convex surface conforming to the surface of a sphere on the side corresponding to the concave surface of said base, and a plane surface on the other, and neck portions thinner than said ears or base connecting the base and ears.

4. In combination with a support, a pin stem joint or catch having a relatively rigid base soldered thereto with soft solder and ears extending from said base at right angles thereto, a neck connecting said ears and base, said neck being of such strength relative to said solder connection as to bend or become distorted prior to the fracture of said solder connection.

5. The method of forming a pin stem joint or catch comprising striking between matched dies a piece of stock to provide different thicknesses thereof with a base and ears, and a thinner portion between the ears and base and then bending said ears at said thinner portion to dispose them at an angle to the base.

6. The method of forming a pin stem joint or catch comprising striking between matched dies a piece of stock to provide different thicknesses thereof with a concavo-concavo base and convex ears, and a thinner portion between the ears and base that the same be more bendable and then simultaneously bending said ears and stretching and bending said base to dispose the ears at an angle to the base.

EUGENE MOREHOUSE.